United States Patent
Frankel et al.

(10) Patent No.: US 10,284,422 B2
(45) Date of Patent: May 7, 2019

(54) RESOURCE-LIMITED DEVICE INTERACTIVITY WITH CLOUD-BASED SYSTEMS

(71) Applicant: EMMOCO, INC., Austin, TX (US)

(72) Inventors: Robert Frankel, Coleta, CA (US); Charles Walden, Austin, TX (US)

(73) Assignee: Emmoco Inc., Austin, TX (US)

( * ) Notice: Subject to any disclaimer, the term of this patent is extended or adjusted under 35 U.S.C. 154(b) by 1029 days.

(21) Appl. No.: 14/897,932

(22) PCT Filed: Mar. 18, 2013

(86) PCT No.: PCT/US2013/032845
§ 371 (c)(1),
(2) Date: Dec. 11, 2015

(87) PCT Pub. No.: WO2013/142432
PCT Pub. Date: Sep. 26, 2013

(65) Prior Publication Data
US 2016/0127179 A1    May 5, 2016

Related U.S. Application Data (60) Provisional application No. 61/612,940, filed on Mar. 19, 2012.

(51) Int. Cl.
*H04L 12/24*    (2006.01)
*G05B 15/02*    (2006.01)
(Continued)

(52) U.S. Cl.
CPC .......... *H04L 41/0806* (2013.01); *G05B 15/02* (2013.01); *G06F 9/00* (2013.01);
(Continued)

(58) Field of Classification Search
CPC . H04L 12/2803; H04L 12/2807; H04L 41/08; H04L 41/0803; H04L 41/0806;
(Continued)

(56) References Cited

U.S. PATENT DOCUMENTS 6,980,660 B1 * 12/2005 Hind ................... H04L 63/0823
380/277
8,165,141 B2 * 4/2012 Balgard .............. H04L 41/0809
370/401
(Continued)

FOREIGN PATENT DOCUMENTS

WO    2013142432 A1    9/2013

OTHER PUBLICATIONS

International Search Report and Written Opinion of the International Searching Authority received in PCT Application Serial No. PCT/US2013/032845 dated Jun. 4, 2013; parent PCT application.

*Primary Examiner* — Normin Abedin
*Assistant Examiner* — William C McBeth
(74) *Attorney, Agent, or Firm* — Jeffrey T. Placker; Holland & Knight LLP (57) ABSTRACT

Resource limited devices may be provided with a communications module enabling the resource limited device to communicate with a more powerful user computing system using a personal area networking protocol. The communications with the user computing system may be used to configure the resource limited device and/or its communications module to communicate with a remote computing system using a local or wide area networking protocol. This technology may shift processing functions that cannot be performed by resource-limited processors of the electronic device to more powerful computing systems, including, but not limited to cloud based systems. Bridges may also coordinate communications between multiple resource limited devices and the more powerful computing systems.

(Continued)

Shifting these processing functions to more powerful computing systems may avoid the need for device manufacturers to include more expensive processors and may reduce device manufacturing costs. Devices and methods are provided.

6 Claims, 5 Drawing Sheets

(51) Int. Cl.
*G06F 9/00* (2006.01)
*H04L 29/08* (2006.01)
*H04W 12/04* (2009.01)
*H04L 29/06* (2006.01)
*G06F 9/50* (2006.01)
*H04L 29/12* (2006.01)

(52) U.S. Cl.
CPC ........ *G06F 9/5072* (2013.01); *H04L 61/6081* (2013.01); *H04L 67/00* (2013.01); *H04L 67/04* (2013.01); *H04L 67/10* (2013.01); *H04L 69/18* (2013.01); *H04W 12/04* (2013.01); *G05B 2219/2642* (2013.01); *G06F 2209/509* (2013.01)

(58) Field of Classification Search
CPC ............ H04L 41/0876; H04L 41/0879; H04L 41/0886; H04L 63/0428; H04L 63/0442; H04L 63/0492; H04L 63/06; H04L 63/061; H04L 63/062; H04L 63/18; H04L 67/04; H04L 67/10; H04L 67/12; H04W 4/008; H04W 12/04
See application file for complete search history.

(56) References Cited

U.S. PATENT DOCUMENTS

| | | | | |
|---|---|---|---|---|
| 9,071,967 | B1* | 6/2015 | Davies | H04W 12/06 |
| 2003/0212802 | A1* | 11/2003 | Rector | H04L 41/08 709/228 |
| 2004/0107366 | A1 | 6/2004 | Balfanz et al. | |
| 2006/0161774 | A1* | 7/2006 | Huh | G06F 21/445 713/168 |
| 2006/0239217 | A1* | 10/2006 | Hassan | H04L 63/0492 370/311 |
| 2008/0147831 | A1* | 6/2008 | Redjaian | H04L 67/18 709/222 |
| 2010/0042834 | A1* | 2/2010 | Moret | H04L 41/0806 713/168 |
| 2010/0303236 | A1* | 12/2010 | Laaksonen | H04L 63/062 380/270 |
| 2010/0312881 | A1 | 12/2010 | Davis et al. | |
| 2011/0015802 | A1* | 1/2011 | Imes | G05D 23/1923 700/300 |
| 2011/0202196 | A1 | 8/2011 | Venkatakrishnan et al. | |
| 2012/0082062 | A1* | 4/2012 | Mccormack | H04W 48/14 370/254 |
| 2013/0014232 | A1* | 1/2013 | Louboutin | H04W 12/06 726/5 |
| 2013/0081113 | A1* | 3/2013 | Cherian | H04W 12/04 726/4 |
| 2013/0091548 | A1* | 4/2013 | Song | H04W 12/04 726/4 |
| 2013/0217359 | A1* | 8/2013 | Cherian | H04W 12/04 455/411 |
| 2013/0223279 | A1* | 8/2013 | Tinnakornsrisuphap | H04W 12/04 370/254 |
| 2013/0272223 | A1* | 10/2013 | Mathews | H04W 4/008 370/329 |
| 2014/0028818 | A1* | 1/2014 | Brockway | H04W 12/04 348/61 |
| 2014/0181504 | A1* | 6/2014 | Almahallawy | H04L 63/062 713/156 |
| 2014/0317242 | A1* | 10/2014 | Koo | H04W 12/04 709/219 |
| 2014/0362991 | A1* | 12/2014 | Ebrom | H04W 12/04 380/270 |
| 2014/0364056 | A1* | 12/2014 | Belk | H04W 12/06 455/41.1 |
| 2015/0172925 | A1* | 6/2015 | Leppanen | H04W 12/04 726/7 |
| 2015/0229475 | A1* | 8/2015 | Benoit | H04L 63/0823 713/168 |

* cited by examiner

RESOURCE-LIMITED DEVICE INTERACTIVITY WITH CLOUD-BASED SYSTEMS

CROSS-REFERENCE TO RELATED APPLICATIONS

This application is a U.S. National Stage of International Patent Application No. PCT/US2013/032845 which claims priority to U.S. Provisional Application No. 61/612,940, filed on Mar. 19, 2012. The disclosure of each of these applications are incorporated herein by reference in their entirety.

BACKGROUND

Many consumer and industrial electronic and electromechanical devices include interfaces through which a user is able to operate the device. For example, climate control systems may include a thermostat or other interface through which a user selects a desired temperature. Garage door openers may include a wireless remote through which a user can transmit a signal to the garage door opener to open or close the garage door. Other devices, such as appliances, scales, audio/visual systems, and tools, often include knobs, buttons, dials, switches, touch screens, or others controls to view device information and change device settings.

As technology has advanced, many of these devices have offered increased functionality at the same or lower cost. For example, climate control, lighting, and other systems can now be programmed to turn on and off and automatically change device settings at different times on different days or in response to other external events. While advancements in processing technologies have resulted in faster and more powerful processors in these electronic devices, cost considerations often limit the capabilities of processors selected for use in electronic devices.

Many end users of electronic devices are not willing to pay the premium required to equip the electronic device with the same processing capabilities as their smart phone or computer. As a result, many electronic devices are equipped with resource-limited processors, such as microcontrollers, that are capable of only performing a minimal set of functions necessary for the user to operate the electronic device. These resource-limited processors used in electronic devices are incapable of running an operating system or even executing basic functions performed by smart phones and other computing systems.

For example, instead of providing an intuitive, graphical user interface as found in many smart phone or web applications, many programmable thermostats require users to cycle through a complex array of menus and submenus with limited feedback on a small display to program the thermostat to set a preset temperature (e.g. 70°) at a preset time (e.g. 5 pm) on a preset day (e.g. each weekday). In addition, several buttons or button combinations may perform different functions depending on the menu further confusing users. For example, the buttons to raise or lower a preset temperature may also be used to change the time in one menu, change a selected mode in a second menu, and change other settings in a third menu.

To avoid including more powerful and costly processors that would enable richer user interfaces, device manufacturers have attempted to simplify user interfaces by consolidating or otherwise limiting device features and functionality. For example, while many programmable thermostats could be configured to support preset temperatures on specific dates of the year, such as January 1 or March 3, few, if any, actually provide this functionality, as it may require additional sets of programmable menus and submenus that may increase the time required to program the thermostat and add to user frustration and confusion. Thus, some manufacturers choose to intentionally limit or restrict features and functionality to make the interfaces simpler to a user and more user-friendly at a given price.

While device manufacturers could upgrade the technology used in the user interfaces of their devices, such an investment may not practical or cost effective, given the costs of upgrading the technology, the quantities of each device model sold, and the price users are willing to pay for the devices. There is a need for more robust and intuitive user interfaces of these devices that are implementable in a cost efficient manner.

DETAILED DESCRIPTION

Different embodiments may include technology facilitating external communications between resource limited devices and more advanced computing systems, such as cloud based systems. This technology may shift processing functions that cannot be performed by resource-limited processors of the electronic device to cloud based system over the Internet or other communications network independent of the device. Shifting these processing functions to more powerful remote systems avoids the need for device manufacturers to include more expensive processors in these devices and reduces device manufacturing costs. A framework and protocol for setting up and enabling bi-directional communication between the electronic device and the remote or cloud based system is also provided.

In some instances, a resource limited device may be modified to include a data transmitter, receiver, and communications protocol capable of communicating with a remote system, including but not limited to, a cloud based system, through a communications network, such as the Internet. For example, the device may include Ethernet, Wi-Fi®, WiMax®, cellular data, and/or a communications chip enabling connectivity between the device and the communications network. The communications chip may enable connectivity between the device and a router or other networking device connected to a larger network of an Internet services provider or other entity.

The configuration of the device and/or communications chip may be done through a separate computing system of a device user, such as a portable smartphone or other computing device that is able to communicate with the device using a second, self configuring direct communications protocol, such as Bluetooth® or Bluetooth Low Energy®. During this configuration process, the computing system of the device user may generate encryption keys, store settings for connecting to a wireless router or joining an existing network, and identify access information, such as URLs, IP addresses, or other address information to enable connectivity between the cloud based system and the device. In some instances, the computing system may communicate with the cloud based system and obtain configuration setting information from the cloud based system which may then be transferred to the device through the direct connection between the device and the user computing system. These configuration settings may be uploaded from the computing system of the user to the device's memory and/or the cloud based system.

Once the device and/or communications chips are configured and able to connect to the communications network, the device may attempt to contact the cloud based system. A configuration application may be executed on the device user's computing system to facilitate the configuration of the device as indicated above. For example, the configuration application may attempt to (i) contact the cloud based system through the communication network to exchange encryption keys with the cloud based system and the register the device with the cloud based system, and/or (ii) establish a direct wired or wireless connection with the device using a communications transmitter and receiving device in the computing system and communications protocol to upload relevant encryption keys to the device and address information and/or connection settings for communicating with the cloud based server. The communications devices and protocols may, in some embodiments, be based on industry standards, such as Wi-Fi®, Bluetooth®, Bluetooth Low Energy®, 3G, 4G, LTE®, Ethernet, WiMax®, and so on to facilitate the ease with which different computing systems will be able to establish direct connectivity with the device and/or connect to the cloud based system through the communication network. In some embodiments, the invention may operate wholly independent of particular communication devices and respective protocols so that any valid communications device and protocol supported by both the device, the cloud based system. and/or the user computing system may be used.

Once the device has been configured, the device and cloud based system may exchange data through the Internet or communications network in a synchronous or asynchronous manner. In an embodiment, a resource limited device may be provided with a communications device that enables the device to connect to and transmit data over a communications network, such as a LAN, WAN, Internet, or other network. The communications device and the cloud based system may use a WebSocket or other web technology providing for bi-directional, full-duplex communications channels, over a single Transmission Control Protocol (TCP) socket. The WebSocket may be configurable and persistent in some instances.

The cloud based system may include a cloud service based on Linux®, Java® Virtual Machine, and persistent network connections. Providers of cloud based services, such as RackSpace® or Amazon® Web Services™ may also be used to host the cloud based system.

In an embodiment, a dedicated mixed-signal microcontroller (which may, in some instances, include 16 k flash memory and 2 k RAM or other variations thereof) may be combined with a networking module, such as a self-contained wireless module (one such exemplary module is the CC3000 module from Texas Instruments®), to provide the device with Wi-Fi® or other network connectivity capabilities. In some instances, additional lines of code (such as about 50 lines of portable 'c' code in some instances) may be provided to enable interactivity with different microcontrollers. Similar arrangements may be used (by replacing the CC3000 module with a respective transceiver circuit) to enable the device to directly connect to the device user's computing system for configuration, such as through Bluetooth® and/or Bluetooth Low Energy®.

Other versions of the portable 'c' may also be created so that applications can be integrated into a processor as an option, though these efforts may require additional resources, such as varying amounts of RAM ranging from less than 2 k to about 12 k depending on the code provided by the device manufacturer or other customer.

As discussed previously, encryption keys may be generated and used by the device and the cloud based system to encrypt communications. In some instances, encryption may be used only during authentication, though in other instances subsequent communications may also be encrypted. The encryption scheme may be an RSA based scheme that may use private and public keys, though other schemes, such as Hummingbird schemes, may also be used in different embodiments. In some embodiments, the encryption scheme may be configured to use no more than a predetermined amount of microcontroller cycles, such as 5% in one exemplary non-limiting example.

Different types of connections may be supported for communications between the cloud based system and the resource-limited device including, persistent, regular interval, and/or on-demand connections. One or more configuration settings may be used to determine which connection type is supported by the device and the cloud based system. These configuration settings may be specified and/or changeable in some instances by the cloud based system.

In some instances, if the persistent type is selected in the configuration settings, the device may use best effort retries to attempt to connect to and/or logon to the cloud based system. In some instances an alert may be transmitted to another system, such as a computing system of the device user if the device is not able to connect to the cloud based system within a certain period or window.

In some instances, the communications module may be configured to be capable of connecting to any router or networking device that allows outbound http get requests on port 80.

During the initial device setup process, the device may be configured to connect to the Internet or communication network of the device user using a network access point. This configuration process may be facilitated by using another existing computing system of the user, such as a smart phone, portable computing device, laptop, or other computing system, to connect to the device and/or the cloud based system. In some instances, a device installation application may be installed on the device user's computing system. The device installation application may be configured to facilitate the initial configuration of the device by using the much more powerful processor of the user's computing system to perform the installation steps that the resource-limited device is incapable of executing. For example, the device installation application may generate a unique identifier for the device, which may, in some instances, be based on the device's MAC address. The device installation application may also generate a public/private encryption key pair. The embedded device may store the private encryption key in a flash memory.

The device installation application may then use the existing communications capabilities of the user's computing system to transfer some of the configuration information to the cloud based system and/or to receive additional configuration information from the cloud based system. For example, cloud based system may determine the cloud based services required for this device based on the unique device identifier which may be used to identify the type of device and/or the type of services the device requires. The generated public key may also be transmitted to the cloud based system. This transmission of the device's public key may allow the cloud based system to authenticate the device. In some instances, the public key transmission may occur during the configuration process. In turn, the cloud based system may send additional configuration instructions to the device to facilitate future interaction for the required cloud based services that the device requires. The cloud based system may also send its public key to the device.

Communications between the device and the cloud based system may occur through a persistent web socket using libraries for different operating systems such as for Android®-based computing systems, iOS®-based computing systems, and Windows®-based computing systems, to list some non-limiting examples. As a second example, Restful APIs may be used for communications between the device and the cloud based system, such as http get and push services and requests, much like mobile application communications with web services.

In some instances, cloud based systems supporting persistent connections and standard web languages, such as Ruby® and Java®, may be used, though in other instances different languages and connection types may be supported.

To provide additional security, the device may be configured to only support communications with a single established URI or other address of the cloud based system that supports communications with the device. The established URI or other address may be based off a domain hosted by the cloud based system provider, device manufacturer, or other trusted third party. In those instances where a single address or URI is provided, the communications may be more secure since hijacking is limited to DNS hijacking, which all Internet based applications are vulnerable to.

Each device may have several pieces of information generated during the configuration process which may include: 1) a unique address, generated from the mac address (generated at runtime), 2) a unique type, generated from the schema at compile time used to define the interface to the device, 3) a URI for accessing this device cloud service (configured at compile time and flashed). Each request to the service may be uniquely identified using all 3 of these pieces of information.

Figure 1:
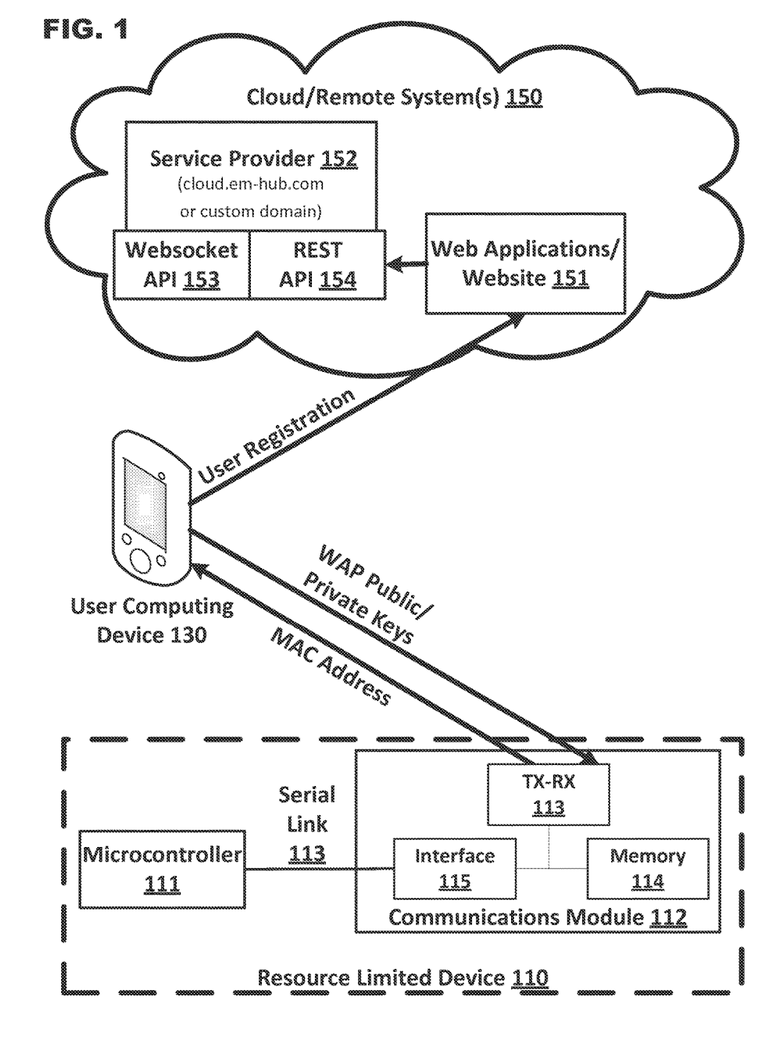
FIG. 1 shows a first exemplary exchange of information and distribution of processing capabilities in a configuration mode.
Figure 2:
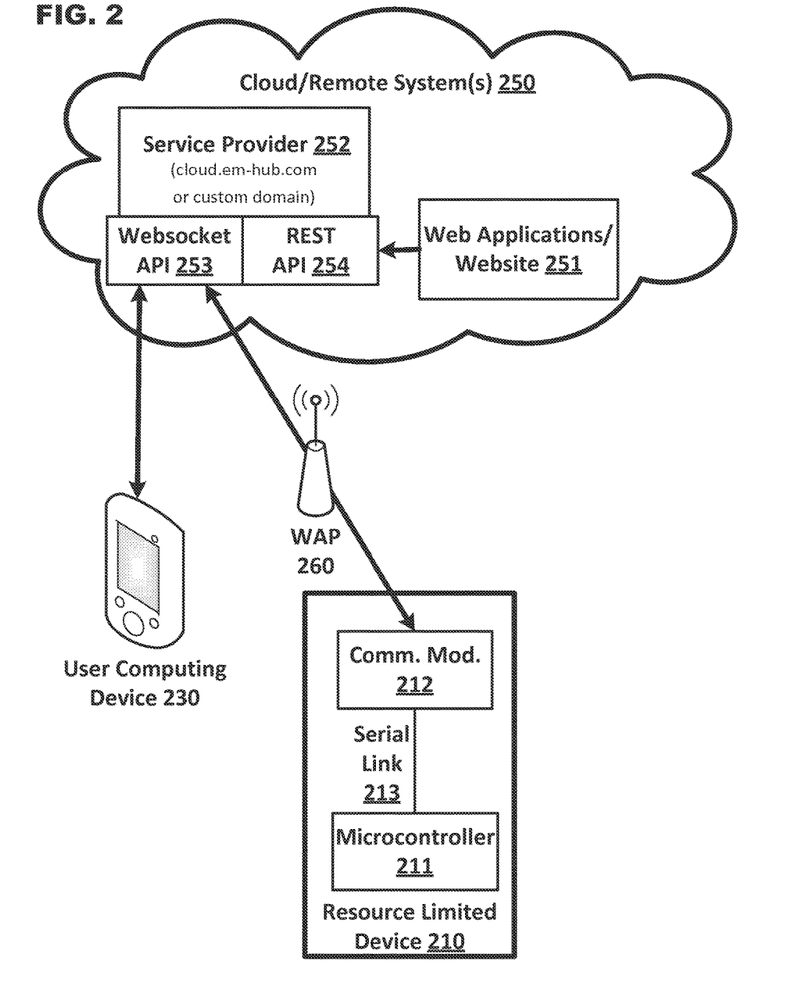
FIG. 2 shows a second exemplary exchange of information and distribution of processing capabilities in an operating mode.

FIG. 1 shows an exemplary exchange of information and distribution of processing capabilities between a cloud based remote system 150, a local user computing device 130, and a resource limited device 110 in a configuration mode. FIG. 2 shows an exemplary exchange of information and distribution of processing capabilities between a cloud based remote system 250, a local user computing device 230, and a resource limited device 210 in an operating mode.

The resource limited device 110, 210 may include any type of electronic control device that include a microcontroller 111, 211 for controlling an operation of another electronic device. The microcontroller 111, 211 may be coupled via a link, which may be a serial link 113, 213, to an interface 115 of a communications module 112, 212.

In some instances, the communications module 112, 212 may be an integrated part of the resource limited device 110, 210, but in other instances the communications module 112, 212, may be a separate component from the resource limited device 110, 210 that is communicatively coupled to the resource limited device 110, 210 through a link, including but not limited to serial link 113, 213. The communications module 112, 212 may also include a transmitter-receiver 116.

The transmitter-receiver 116 may be configured to initially receive configuration data from a first computing system, such as user computing device 130, using a first communications protocol. The first communications protocol may include a local device to device protocol, such as a Bluetooth® protocol or other personal area network protocol. Once configuration is complete, the transmitter-receiver 116 may use the configuration information to transmit data from the resource limited device 110, 210 obtained from the interface 115 to a second computing system, such as remote system 150, 250, hosted by a service provider 152, 252, using a second communications protocol. The remote computing system 150, 250 may located offsite from the resource limited device 110, 210, and may be accessed over a communications network, which may include the Internet. The second communications protocol may include a local or wide area networking protocol, including but not limited to a Wi-Fi®, Wi-Max®, cellular, microwave, or other local or wide area networking protocol. The configuration data may specify at least one configuration setting for the communication module 112 to communicate with the remote computing system 150, 250 using the second communications protocol.

The remote computing system 150, 250, may include a cloud based system accessible over the Internet. The remote computing system 150, 250 may include a web application 151, 251 for resource limited devices 110, 210. The web application 151, 251 may be used by a user computing device 130, 230, to initially register the device 110, 210 with the remote system 150 or to obtain configuration information from remote system 150, 250. The configuration information may include an encryption key, such as a public key, used by the remote system 150 for communications with the resource limited device 110, 210; configuration information for the resource limited device 110, 210 to access or contact the remote system 150, 250, such as through a websocket application programming interface (API); or other information.

The web application 151, 251 may use a representational state transfer (REST) style architecture API 154, 254 to communicate with a service provider 152 providing the back end services and data for the remote system 150, 250. Once the configuration of the resource limited device 110, 210 is complete, the resource limited device 110, 210 and/or user computing system 130, 230 may directly communicate with the service provider 152 through a websocket API 153, 253 of the remote system 150, 250 using the configuration data provided to the communications module 112, 212 of the resource limited device 110, 210.

During configuration, information about the resource limited device 110, 210 including but not limited to an identifier of the resource limited device 110, 210 or its connected communications module 112, 212 may be transmitted by the transmitter-receiver 116 to the user computing device 130, 230 using the first protocol. In some instances the identifier may include a network interface identifier or media access control address. The user computing device 130, 230 may then transmit this information to the remote computing system 150, 250 in order to register the resource limited device 110, 210 with the remote system 150, 250.

The user computing device 130, 230 may also generate an encryption key for use by the resource limited device 110, 210 and/or its communications module 113, 213 for encrypted communications with the remote system 150, 250. If a public key cryptographic algorithm is used, the user computing device 130, 230 may transmit the public and private keys to the resource limited device 110, 210 using the first protocol. The public and private keys may, in some instances, be transmitted to the resource limited device 110, 210 as part of the configuration data transmitted to the resource limited device 110, 210. The user computing device 130, 230 may also transmit a copy of the public key of the resource limited device 110, 210 to the remote system 150, 250.

The user computing device 130, 230 may transmit other types of configuration data to the resource limited device 110, 210. For example, resource limited device 110, 210 may receive at its transmitter-receiver 116 an uniform resource identifier, uniform resource locator, network address, network setting, or other network information of the remote computing system 150, 250 from the user computing device 130, 230, to enable to the resource limited device 110, 210 to contact the remote computing system 150, 250 in the operating mode. The communications module may also include a memory 114 storing the configuration data.

In the operating mode, the transmitter-receiver 116 of the communications module 112, 212, may receive resource limited device data from the remote computing system 150, 250, via, in some instances, a websocket API 153, 253 of the remote system 150, 250. The communications module 112, 212, may send the received resource limited device data to the resource limited device 110, 210 through interface 115 and link 113, 213.

The transmitter-receiver 113 may also be configured to transmit information about the communications module 112 to the user computing device 130, receive data intended for the resource limited device 110 from the remote computing system 150, and send the received resource limited device data to the resource limited device 110 through the interface 115.

The user computing device 130, 230 may be a portable computing device, including but not limited to a smartphone, tablet, or laptop. In some instances, the user computing device 130, 230 may also include other computing devices located locally to the resource limited device 110, 120, such as desktop computers, servers, or other computers.

In instances where the communications module 112, 212 is part of the resource limited device 110, 210, the resource limited device 110, 210 may include a microcontroller 111, a communications module 112, 212, a memory 114, a transmitter, and a receiver. The transmitter and receiver may be part of a transceiver or transmitter-receiver 116.

The microcontroller 111, 211 may control an operation of the resource limited device 110, 210. The communications module 112, 212 may be linked to the microcontroller 111, 211. The memory 114 may store an identifier of the resource limited device 110, 210 and an encryption key.

The receiver in the communications module 112, 212 may be configured to (i) receive the encryption key and a configuration setting for a second communications protocol from the user computing device 130, 230, that is physically separate from the resource limited device 110, 210, using a first communications protocol. The receiver may store the received encryption key and configuration setting in the memory 114. The receiver may receive data from a remote computing system 150, 250 over a communications network using a second communications protocol. The receiver may send the received data to the resource limited device 110, 210 through the link 113.

The transmitter in the communications module 112, 212 may be configured to transmit the stored identifier of the resource limited device 110, 210 to the user computing device 130, 230 using the first communications protocol before the encryption key is received at the receiver. The transmitter may transmit data from the resource limited device 110, 210 obtained through the link 113 to the remote computing system 150, 250 over the communications network using the second communications protocol after the second communications protocol is configured at the resource limited device 110, 210 with the configuration setting.

The user computing device 130, 230 may generate and transmit a first public and a first private encryption key to the resource limited device 110, 210 that are stored in the memory 114. The user computing device 130, 230 may present a user with a user interface for the user to provide the configuration setting for the second communications protocol. The user computing device 130, 230 may transmit the user provided configuration setting for the second communications protocol to the resource limited device 110, 210 using the first communications protocol. The user computing device 130, 230 may transmit the stored identifier of the resource limited device 110, 210 to the second computing system using a third protocol to register the resource limited device 110, 210 at the remote computing system 150, 250

In some instances the user computing device 130, 230 may present the user with a user interface for providing registration information to the remote computing system 150, 250 in order to register the resource limited device 110, 210 with the remote computing system 150, 250. The user computing device 130, 230 may transmit the user provided registration information to the remote computing system 150, 250. The remote computing system 150, 250 may register the resource limited device 110, 210 based on the user provided registration information and the stored identifier. The remote computing system 150, 250 may also transmit a public encryption key of the remote computing system 150, 250 to the resource limited device 110, 210. In some instances, the remote computing system 150, 250 may transmit its public encryption key to the resource limited device 110, 210 via the user computing device 130, 230.

Figure 3:
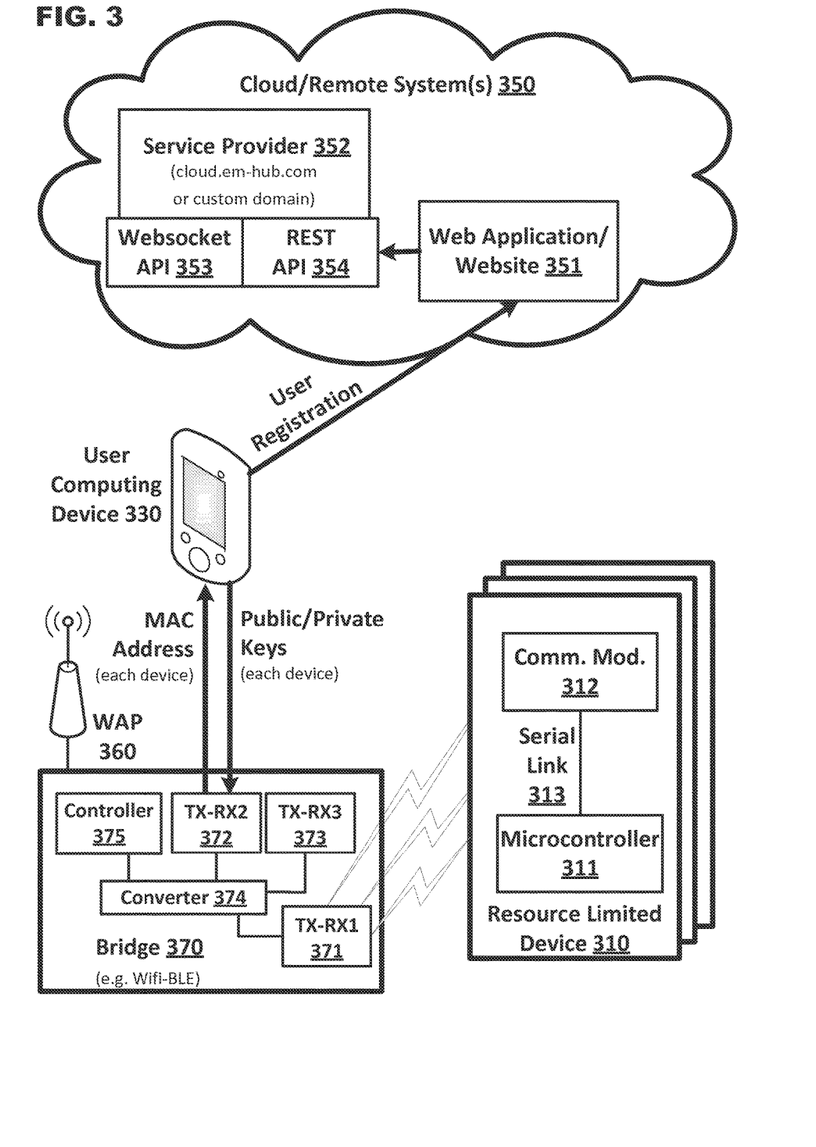
FIG. 3 shows a third exemplary exchange of information and distribution of processing capabilities using a bridge in a configuration mode.
Figure 4:
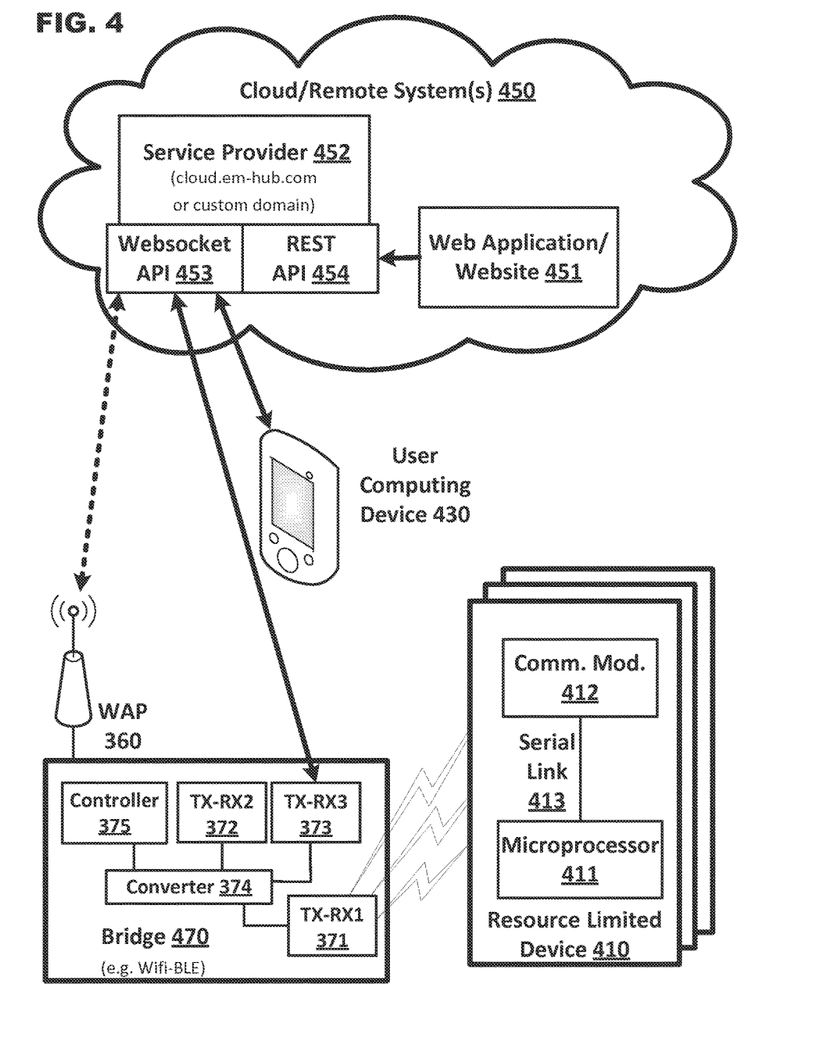
FIG. 4 shows a fourth exemplary exchange of information and distribution of processing capabilities using a bridge in an operating mode.

FIG. 3 shows an exemplary exchange of information and distribution of processing capabilities between a cloud based remote system 350, a local user computing device 330, a bridge 370, and several resource limited devices 310 in a configuration mode. FIG. 4 shows an exemplary exchange of information and distribution of processing capabilities between a cloud based remote system 450, a local user computing device 430, bridge 470, and several resource limited devices 410 in an operating mode.

The resource limited devices 310, 410 may include any type of electronic control device that include a microcontroller 311, 411 for controlling an operation of another electronic device. The microcontrollers 311, 411 may be coupled via a link, which may be a serial link 313, 413, to an interface 115 of each respective communications module 312, 412.

In some instances, the communications modules 312, 412 may be an integrated part of the resource limited devices 310, 410, but in other instances the communications module 312, 412, may be a separate components from the resource limited devices 310, 410. The communications modules 312, 412 may also include transmitter-receivers 116.

The transmitter-receivers 116 may be configured to communicate with a bridge 370, 470 using a first communications protocol. The first communications protocol may include a local device to device protocol, such as a Bluetooth protocol or other personal area network protocol. The bridge may be configured to communicate with a user computing device 330, 430 using a second communications protocol and the remote computing system 350, 450, using a third communications protocol. Once configuration is complete, the transmitter-receivers 116 may use the bridge as an intermediary for communicating with the user computing device 330, 430 and remote computing system 350, 450.

The remote computing system 350, 450 may located offsite from the resource limited device 310, 410, and may be accessed over a communications network, which may include the Internet. The second and/or third communications protocols may include a local or wide area networking protocol, including but not limited to a Wi-Fi®, Wi-Max®, cellular, microwave, or other local or wide area networking protocol. The configuration data may specify at least one configuration setting for the bridge 370, 470 to communicate with the remote computing system 350, 450 using the third communications protocol.

The remote computing system 350, 450, may include a cloud based system accessible over the Internet. The remote computing system 350, 450 may include a web application 351, 451. The web application 351, 451 may be used by a user computing device 330 and/or bridge 370 to initially register each of the resource limited devices 310, 410 with the remote system 350 or to obtain configuration information from remote system 350. The configuration information may include an encryption key, such as a public key, used by the remote system 350, 450 for communications with one or more resource limited devices 310, 410; configuration information for the resource limited device 310, 410 to access or contact the remote system 350, 450, such as through a websocket application programming interface (API) 353, 453; or other information.

The web application 351, 451 may use a representational state transfer (REST) style architecture API 354, 454 to communicate with a service provider 352, 452 providing the back end services and data for the remote system 350, 450. Once the configuration of the resource limited devices 310, 410 is complete, the resource limited devices 310, 410 and/or user computing system 330, 430 may directly communicate with the service provider 352, 452 through a websocket API 353, 453 of the remote system 350, 450.

During configuration, information about the resource limited device 310, 410 including but not limited to an identifier of the resource limited device 310, 410 or its connected communications module 312, 412 may be transmitted by the transmitter-receiver 116 to the bridge 370, 470 using the first protocol. The bridge may communication the information to user computing device 330, 430 using the second protocol or to the remote system 350, 450 using the third protocol. The user computing device 330, 430 may then transmit this information to the remote computing system 350, 450 in order to register each resource limited device 310, 410 with the remote system 350, 450 if the bridge 370 did not transmit the information directly to the remote system 350, 450.

The user computing device 330, 430 may also generate an encryption key for each resource limited device 310, 410 and/or its communications module 313, 413 for encrypted communications with the remote system 350, 450. If a public key cryptographic algorithm is used, the user computing device 330, 430 may transmit a public and private key for a respective device 310, 410 to the respective resource limited device 310, 410 via bridge 370. The public and private keys may, in some instances, be transmitted to the resource limited device 310, 410 as part of the configuration data transmitted to the resource limited device 310, 410. The user computing device 330, 430 may also transmit a copy of the public key of a respective resource limited device 310, 410 to the remote system 350, 450.

The user computing device 330, 430 may transmit other types of configuration data to the resource limited device 310, 410 and/or bridge 370. For example, bridge 370 and/or resource limited device 310, 410 may receive at its transmitter-receiver 116 an uniform resource identifier, uniform resource locator, network address, network setting, or other network information of the remote computing system 350, 450 from the user computing device 330, 430 via bridge 370, to enable to the resource limited device 310, 410 and/or bridge 370, 470 to contact the remote computing system 350, 450 in the operating mode. The communications module may also include a memory 114 storing the configuration data.

In the operating mode, the transmitter-receiver 116 of the communications module 312, 412, may receive resource limited device data from the remote computing system 350, 450, via, the bridge 370, 470 and a websocket API 353, 453 of the remote system 350, 450. The communications module 312, 412, may send the received resource limited device data to the resource limited device 310, 410 through interface 115 and link 313, 413.

The transmitter-receiver 113 may also be configured to, via bridge 370, 470, transmit information about the communications module 312, 412 to the user computing device 330, 430, receive data intended for the resource limited device 310, 410 from the remote computing system 350, 450, and send the received resource limited device data to the resource limited device 310, 410 through the interface 115.

The user computing device 330, 430 may be a portable computing device, including but not limited to a smartphone, tablet, or laptop. In some instances, the user computing device 330, 430 may also include other computing devices located locally to the resource limited device 310, 420, such as desktop computers, servers, or other computers.

In instances where the communications module 312, 412 is part of the resource limited device 310, 410, the resource limited device 310, 410 may include a microcontroller 311, 411, a communications module 312, 412, a memory 114, a transmitter, and a receiver. The transmitter and receiver may be part of a transceiver or transmitter-receiver 116.

The bridge 370, 470 may include three types of transmitter-receivers. At least one first transmitter-receiver 371 may be configured to communicate with a plurality of resource limited devices 310, 410 using a first communications protocol. At least one second transmitter-receiver 372 may be configured to communicate with a user computing device 330, 430 using a second communications protocol. At least one third transmitter-receiver 373 may be configured to communicate with a remote system over a communications network using a third communications protocol.

The bridge 370, 470 may also include a converter 374 for converting data between the protocols. The bridge may also include a controller 375 for scheduling outgoing data transmissions from the bridge 370, 470 to avoid conflicts.

The at least one first transmitter-receiver 371 may receive an identifier of the resource limited device 310, 410 from a resource limited device 310, 410 using the first protocol. The at least one second transmitter-receiver 372 may transmit the identifier to the user computing device 330, 430 using the second protocol after conversion by the converter 374.

The at least one second transmitter-receiver 372 may receive an encryption key and a configuration setting for said resource limited device 310, 410 using the second protocol. The at least one first transmitter-receiver 371 may transmit the encryption key to said resource limited device 310, 410 using the first protocol. The at least one first transmitter-receiver 371 may receive a request from said resource limited device 310, 410 to communicate with the remote system 350, 450.

The at least one third transmitter-receiver 373 may transmit data to or receives data from the remote system 350, 450 relating to said resource limited device 310, 410 over the communications network using the third protocol configured according to the configuration setting, wherein at least one segment of the data is encrypted based on the encryption key. In some instances, the first protocol may be a Bluetooth® non-low energy protocol. The second protocol may be a Bluetooth Low Energy® protocol. The third protocol may be a Wi-Fi® protocol. The communication network may be the Internet. The configuration setting may be a setting for communicating with the remote system 350, 450 through a websocket application programming interface (API) 353, 453 of the remote system 350, 450.

Figure 5:
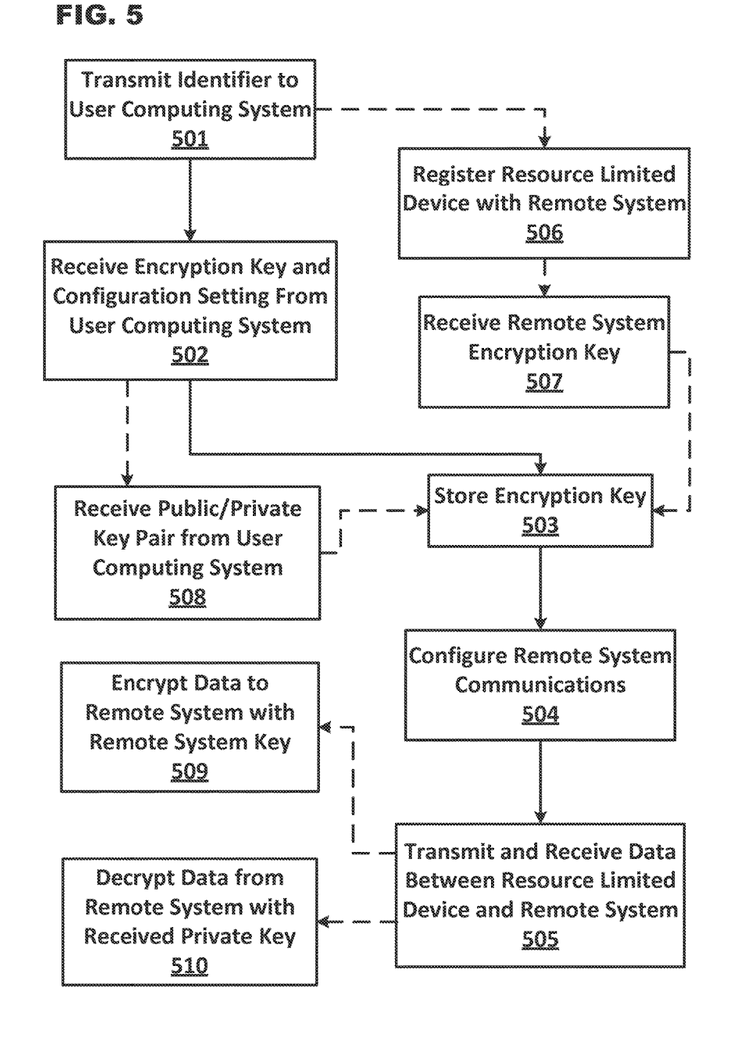
FIG. 5 shows exemplary methods in different embodiments.

FIG. 5 shows exemplary methods in different embodiments. In box 501, an identifier of a resource limited device may be transmitted at a transmitter of a communications module connected to the resource limited device. The identifier may be transmitted to a user computing device using a first communications protocol.

In box 502, an encryption key and a configuration setting for communicating with a remote computer system over a communications network may be received from the user computing device using a second communications protocol. The encryption key and configuration setting may be received at a receiver of the communications module connected to the resource limited device.

In box 503, the received encryption key may be stored in a memory of the resource limited device and/or the communications module.

In box 504, the received configuration setting may be used to configure communications between the communications module of the resource limited device and the remote computing system.

In box 505, data may be transmitted and received between the resource limited device and the remote computing system over the communications network using the second communications protocol. This data may be transmitted and received after the configuring of communications in box 504. In some instances, at least some of the data transmitted or received between the resource limited device and the remote computing system may be encrypted based on the encryption key.

In box 506, the communications module may receive a first public and private encryption key from the user computing device that is intended for the resource limited device. The first public and private key pair may be generated by the user computing device. In some instances, the user computing device may transmit the first public key and identifier of the resource limited device to the remote computing system using a third protocol to register the resource limited device at the remote computing system.

In box 507, the resource limited device may be registered with the remote computing system via the user computing device.

In box 508, a second public encryption key of the remote computing system may be received at the communications module of the resource limited device from the user computing device using the first protocol.

In box 509, communications to the remote computing system from the communications module may be encrypted using a second public encryption key of the remote computing system.

In box 510, encrypted communications from the second computing system to the resource limited device may be decrypted using the first private encryption key.

The foregoing description has been presented for purposes of illustration and description. It is not exhaustive and does not limit embodiments to the precise forms disclosed. Modifications and variations are possible in light of the above teachings or may be acquired from the practicing embodiments consistent with those described herein. For example, in some embodiments the resource limited device may receive an encryption key, such as a public encryption key, of the remote computing system from either the user computing system or the remote system, but in other instances, the encryption key of the remote system may be preloaded in a memory of the resource limited device or its communications module.

We claim:

1. A resource limited device comprising:
a microcontroller controlling an operation of the resource limited device;
a communications module linked to the microcontroller via a link;
a memory storing an identifier of the resource limited device and one or more encryption keys;
a receiver in the communications module configured to (i) receive the one or more encryption keys and a configuration setting for a second communications protocol from a first computing system separate from the resource limited device using a first communications protocol, wherein at least one encryption key of the one or more encryption keys is generated by the first computing system for communicating with a second computing system, (ii) store the received one or more encryption keys and configuration setting in the memory, (iii) receive data from the second computing system over a communications network using the second communications protocol, and (iv) send the received data to the microcontroller through the link; and
a transmitter in the communications module configured to (i) transmit the stored identifier of the resource limited device to the first computing system using the first communications protocol before the one or more encryption keys is received at the receiver, and (ii) transmit data from the microcontroller, obtained through the link, to the second computing system over the communications network using the second communications protocol after the second communications protocol is configured at the resource limited device with the configuration setting;
wherein the first computing system:
generates and transmits the one or more encryption keys to the resource limited device that are stored in the memory, wherein the one or more encryption keys include a first public encryption key and a first private encryption key;
presents a user with a user interface for providing the configuration setting for the second communications protocol;

transmits the user provided configuration setting for the second communications protocol to the resource limited device using the first communications protocol; and transmits the stored identifier of the resource limited device to the second computing system using a third communications protocol to register the resource limited device at the second computing system.

2. The resource limited device of claim 1, wherein:

the first computing system presents the user with a user interface for providing registration information to the second computing system and transmits the user provided registration information to the second computing system; and the second computing system registers the resource limited device based on the user provided registration information and the stored identifier of the resource limited device and transmits a second public encryption key of the second computing system to the resource limited device.

3. The resource limited device of claim 2, wherein the second computing system transmits the second public encryption key of the second computing system to the resource limited device via the first computing system.

4. A method, comprising:

transmitting, at a transmitter of a communications module connected to a resource limited device, an identifier of the resource limited device to a first computing system using a first communications protocol;

receiving from the first computing system, using the first communications protocol at a receiver of the communications module connected to the resource limited device, one or more encryption keys and a configuration setting for communicating with a second computing system over a communications network using a second communications protocol, wherein at least one encryption key of the one or more encryption keys is generated by the first computing system for communicating with a second computing system;

storing the one or more encryption keys;

configuring communications with the second computing system with the received configuration setting;

transmitting and receiving data between the resource limited device and the second computing system over the communications network using the second communications protocol after the configuring;

receiving the one or more encryption keys from the first computing system for the resource limited device, wherein the one or more encryption keys include a first public encryption key and a first private encryption key generated by the first computing system;

encrypting communications to the second computing system using a second public encryption key of the second computing system; and decrypting encrypted communications from the second computing system using the first private encryption key;

wherein the first computing system transmits the first encryption public key and identifier of the resource limited device to the second computing system using a third communications protocol to register the resource limited device at the second computing system.

5. The method of claim 4, wherein at least some of the data is encrypted based on the one or more encryption keys.

6. The method of claim 4, further comprising:

registering the resource limited device with the second computing system via the first computing system; and receiving the second public encryption key of the second computing system from the first computing system using the first communications protocol.

* * * * *